United States Patent
Rossi et al.

(10) Patent No.: US 12,206,135 B2
(45) Date of Patent: Jan. 21, 2025

(54) ELECTRIC POWER MODULE AND METHOD FOR ASSEMBLING IT

(71) Applicant: ALMA MATER STUDIORUM—UNIVERSITA' DI BOLOGNA, Bologna (IT)

(72) Inventors: Claudio Rossi, Bologna (IT); Alessio Pilati, Bologna (IT); Matteo Marano, Argelato (IT)

(73) Assignee: ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 77 days.

(21) Appl. No.: 17/255,176

(22) PCT Filed: Jun. 19, 2019

(86) PCT No.: PCT/IB2019/055139
§ 371 (c)(1),
(2) Date: Dec. 22, 2020

(87) PCT Pub. No.: WO2020/003059
PCT Pub. Date: Jan. 2, 2020

(65) Prior Publication Data
US 2021/0249740 A1  Aug. 12, 2021

(30) Foreign Application Priority Data

Jun. 25, 2018 (IT) .................. 102018000006642

(51) Int. Cl.
*H01M 50/516* (2021.01)
*H01M 10/04* (2006.01)
(Continued)

(52) U.S. Cl.
CPC ....... *H01M 50/516* (2021.01); *H01M 10/049* (2013.01); *H01M 10/486* (2013.01);
(Continued)

(58) Field of Classification Search
CPC ............. H01M 50/516; H01M 10/049; H01M 10/486; H01M 10/654; H01M 50/213;
(Continued)

(56) References Cited

U.S. PATENT DOCUMENTS

2006/0227521 A1* 10/2006 Nam ...................... H05K 3/242
361/780
2008/0220324 A1* 9/2008 Phillips ............. H01M 10/4207
29/623.1
(Continued)

FOREIGN PATENT DOCUMENTS

EP          1780825 A1    5/2007
JP       2012221738 A   11/2012

OTHER PUBLICATIONS

International Search Report issued in International Patent Application PCT/IB2019/055139 mailed Aug. 9, 2019.
(Continued)

*Primary Examiner* — Lisa S Park
(74) *Attorney, Agent, or Firm* — United IP Counselors, LLC

(57) ABSTRACT

An electric power module comprises: a plurality of electric power units, each of which extends along a longitudinal direction from a first end, including a first electrode, to a second end, including a second electrode; a first panel, including a first plurality of contact elements, each of which is in contact with the first electrode of a corresponding power unit; a second panel, including a second plurality of contact elements, each of which is in contact with the second electrode of a corresponding power unit. In the module, the first panel comprises a first plurality of holes, each of which is aligned, along the longitudinal direction, with a respective contact element of the first plurality of contact elements and with a respective first electrode, and the second panel comprises a second plurality of holes, each of which is
(Continued)

aligned, along the longitudinal direction, with a respective contact element of the second plurality of contact elements and with a respective second electrode.

18 Claims, 9 Drawing Sheets

(51) Int. Cl.

| | | |
|---|---|---|
| *H01M 10/48* | (2006.01) |
| *H01M 10/613* | (2014.01) |
| *H01M 10/615* | (2014.01) |
| *H01M 10/625* | (2014.01) |
| *H01M 10/63* | (2014.01) |
| *H01M 10/654* | (2014.01) |
| *H01M 50/213* | (2021.01) |
| *H01M 50/284* | (2021.01) |
| *H01M 50/51* | (2021.01) |
| *H01M 50/528* | (2021.01) |

(52) U.S. Cl.
CPC ....... *H01M 10/654* (2015.04); *H01M 50/213* (2021.01); *H01M 50/284* (2021.01); *H01M 50/51* (2021.01)

(58) Field of Classification Search
CPC .. H01M 50/284; H01M 50/51; H01M 10/625; H01M 10/613; H01M 10/615; H01M 10/63; H01M 50/528; Y02P 70/50
See application file for complete search history.

(56) References Cited

U.S. PATENT DOCUMENTS

| | | | | |
|---|---|---|---|---|
| 2009/0098750 A1* | 4/2009 | Randall | ................ | H01R 25/147 |
| | | | | 307/147 |
| 2009/0111009 A1* | 4/2009 | Goesmann | ............... | H01G 9/26 |
| | | | | 429/120 |
| 2009/0155680 A1* | 6/2009 | Maguire | ............. | H01M 10/643 |
| | | | | 429/158 |
| 2011/0080139 A1* | 4/2011 | Troxel | ................ | H01M 10/441 |
| | | | | 320/136 |
| 2013/0082659 A1* | 4/2013 | Kano | .................. | H01M 50/213 |
| | | | | 307/66 |
| 2015/0222131 A1* | 8/2015 | Kano | ..................... | B60L 50/64 |
| | | | | 320/112 |
| 2016/0211562 A1* | 7/2016 | Bobinet | ............. | H01M 10/613 |
| 2018/0029483 A1 | 2/2018 | Core | | |

OTHER PUBLICATIONS

Written Opinion issued in International Patent Application PCT/IB2019/055139 mailed Aug. 9, 2019.

* cited by examiner

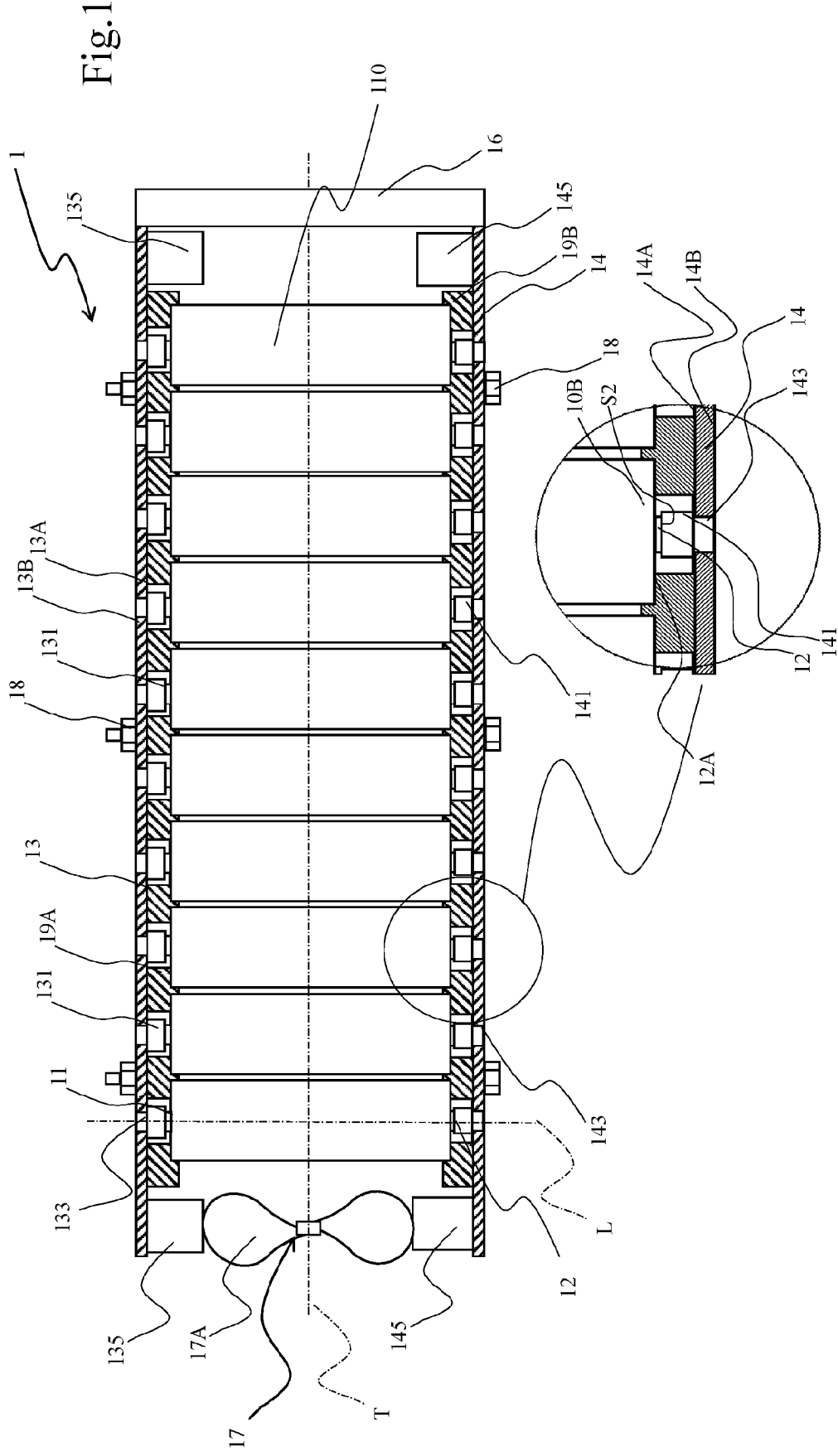

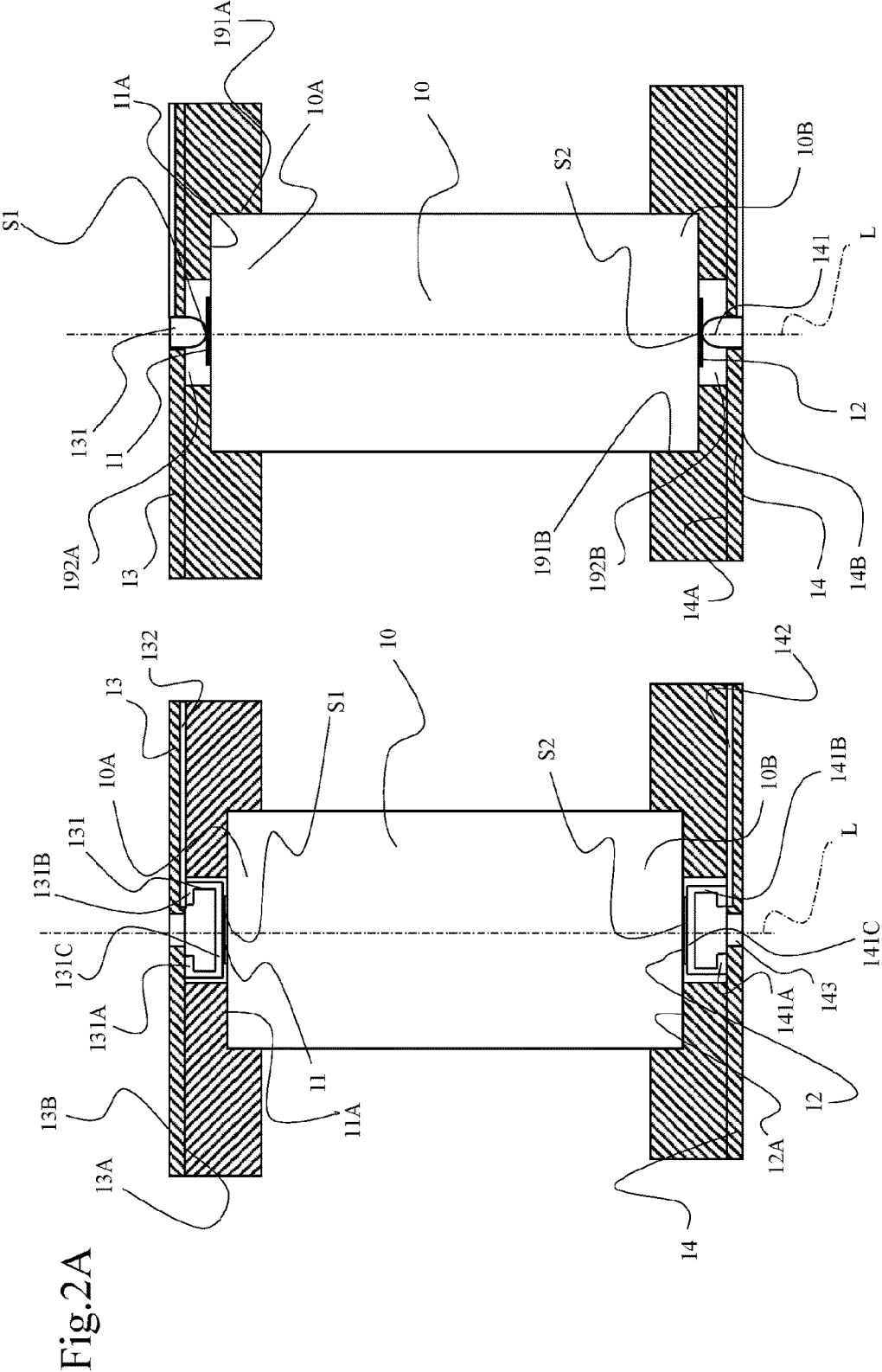

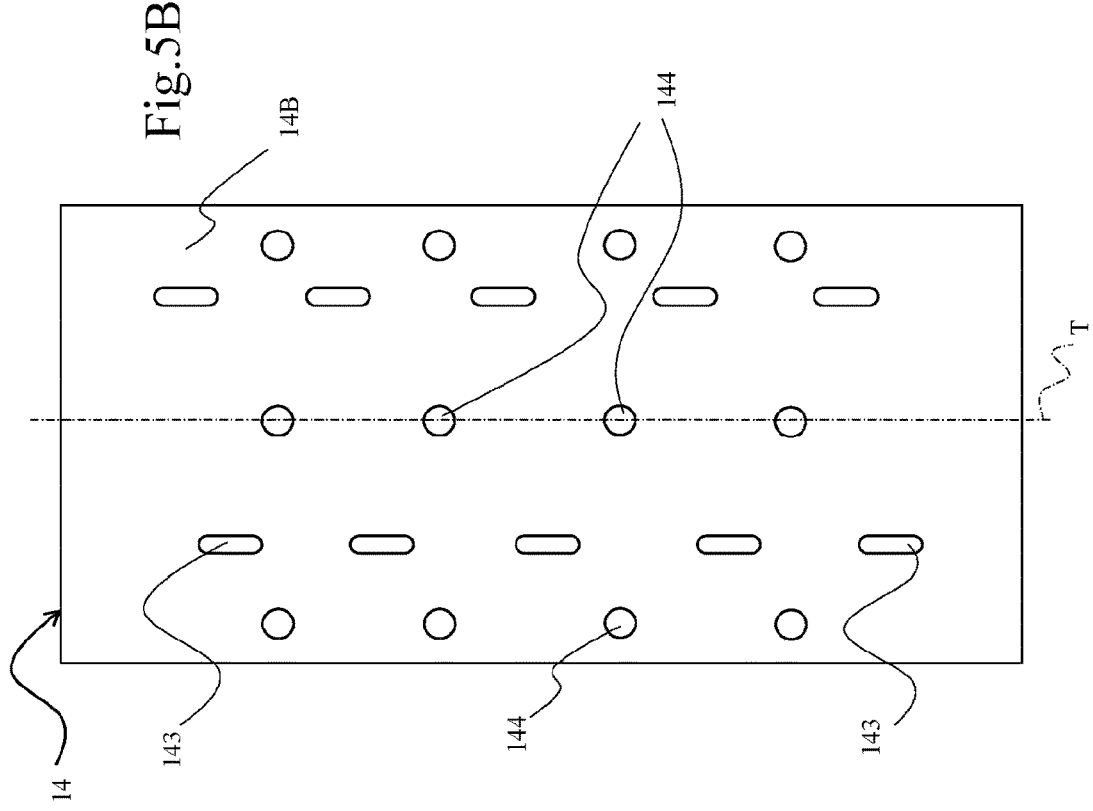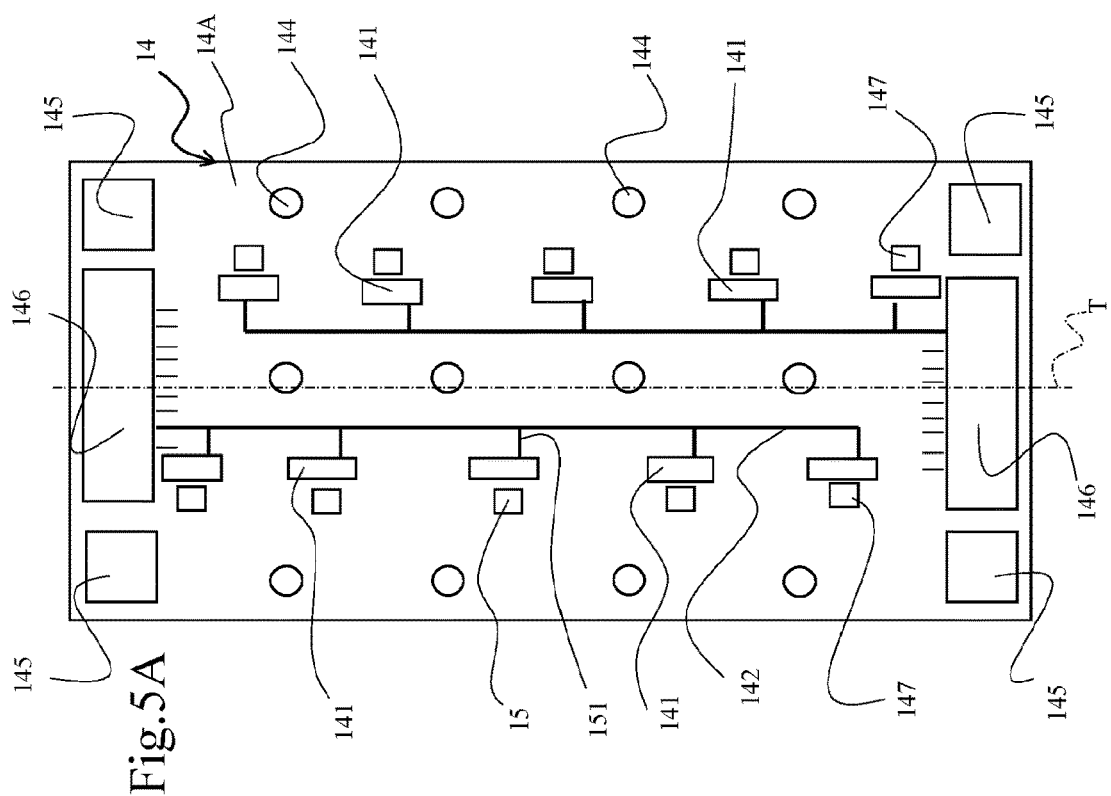

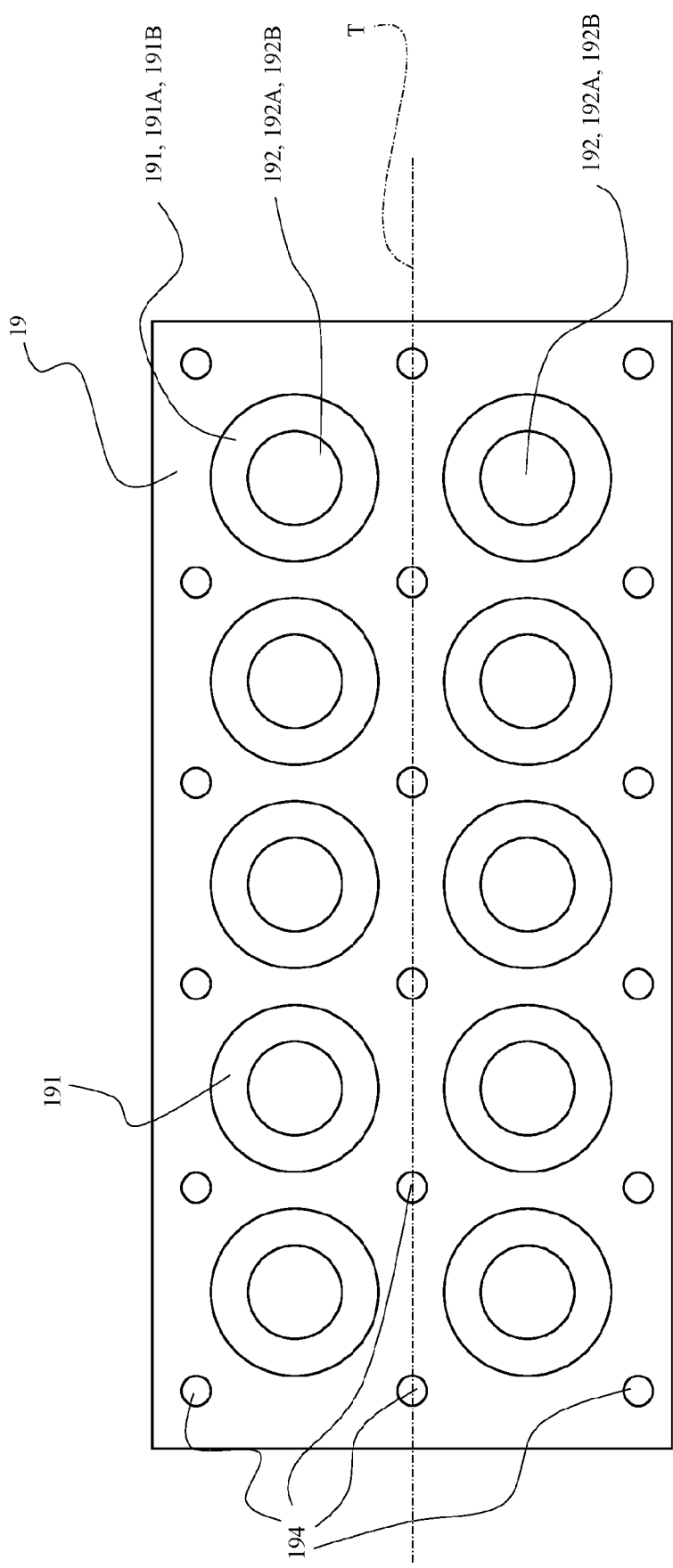

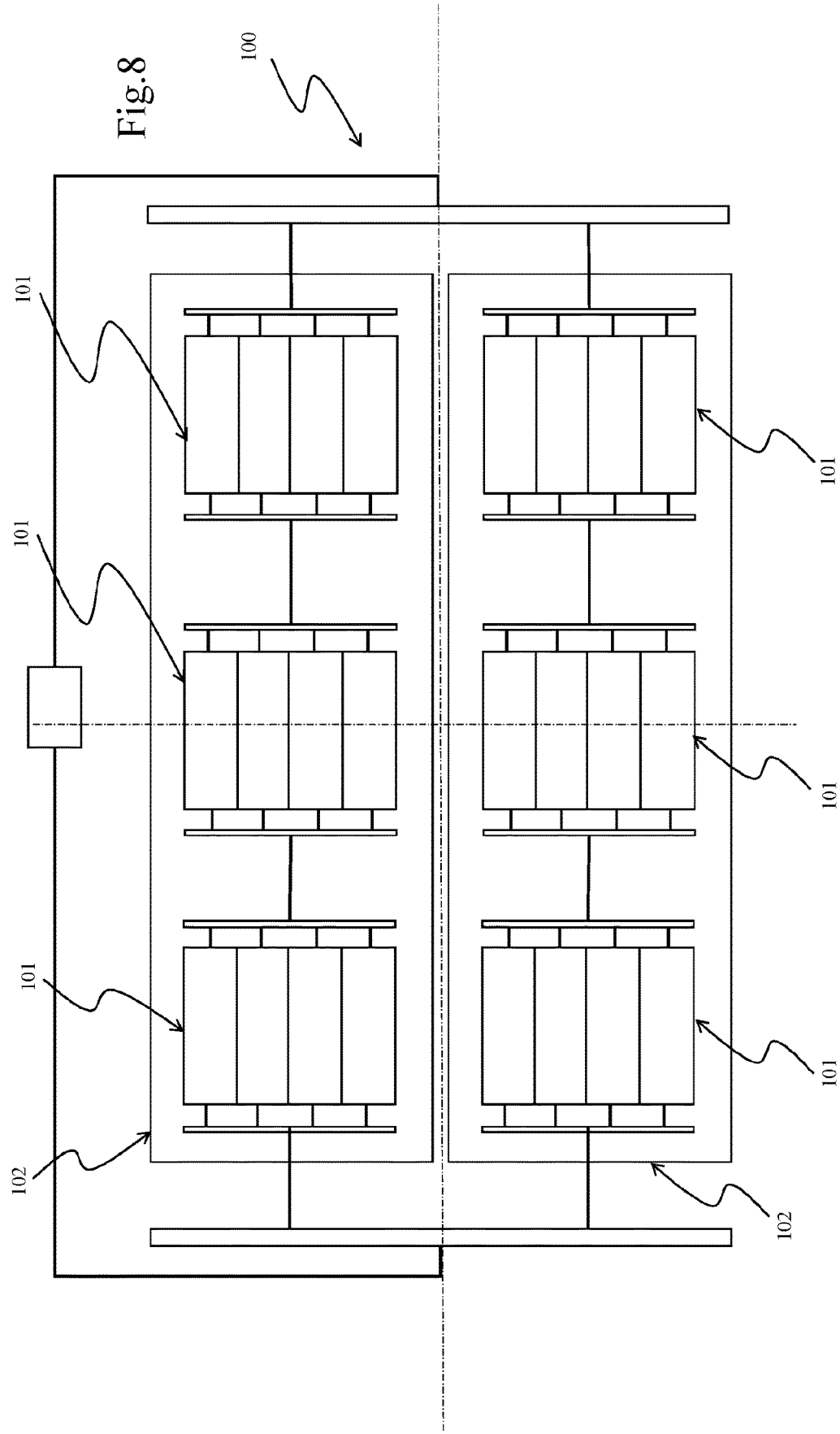

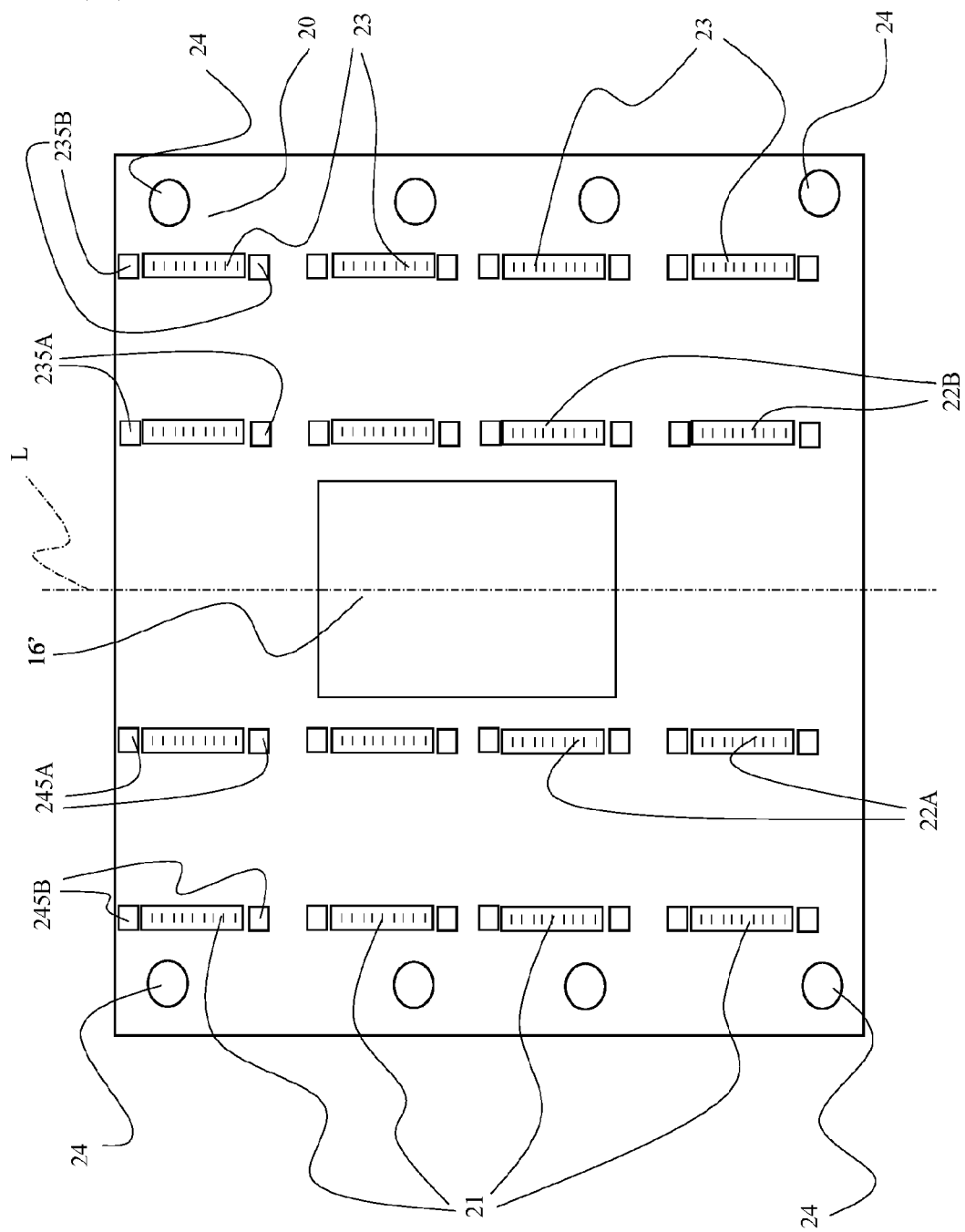

ELECTRIC POWER MODULE AND METHOD FOR ASSEMBLING IT

TECHNICAL FIELD

This invention relates to a power module and a method for making it.

BACKGROUND ART

The technical sector to which this invention belongs is that of generation of electric power systems for powering machines or devices which run on electricity.

In that sector there is ever increasing demand for very compact batteries which also supply high power for a lengthy period of time.

There are prior art solutions in the sector in which prismatic batteries are connected to each other to form more powerful electric power modules. However, those solutions have several disadvantages. Those disadvantages may be economic, due to the cost of prismatic batteries, but may also reduce the flexibility of the final module, in any case linked to the power of its basic unit which in that case is a prismatic battery.

In other prior art solutions, smaller power units are used (for example cylindrical) which are connected to each other. The latter are a good compromise between cost and flexibility. However, the power being equal, the number of connections to be made is very high and that translates into a significant increase in the costs linked to assembly of the module which nullify the advantages previously referred to.

In fact, the connections are made using two known methods: "wire bonding", in which a wire of meltable material is connected to the electrode of the power unit to be connected using sheets soldered to the electrodes and to a copper collector (or to a connection wire).

However, those solutions cannot be automated and therefore have the disadvantage of requiring long assembly times for high levels of electric power.

DISCLOSURE OF THE INVENTION

The aim of this invention is to make available an electric power module and a method for assembling it which overcome the above-mentioned disadvantages of the prior art.

Said aim is fulfilled by the electric power module, and by the method for assembling it, according to this invention, as described in the appended claims.

According to one aspect of this description, this invention provides an electric power module. In one embodiment, the power module includes a plurality of electric power units. Each electric power unit extends along a longitudinal direction from a first end to a second end. In one embodiment, the first end includes a first electrode. In one embodiment, the second end includes a second electrode. In one embodiment, the power units of said plurality are juxtaposed with each other transversally (along a perpendicular, transversal direction) to the longitudinal direction.

In one embodiment, the power module comprises a first panel. The first panel has an inside surface, facing towards the first ends of the power units of said plurality of power units. In one embodiment, the first panel includes a first plurality of contact elements (terminals). Each contact element (terminal) of said first plurality of contact elements (terminal) is in contact with the first electrode of a corresponding power unit.

In one embodiment, the power module comprises a second panel. The second panel has an inside surface, facing towards the second ends of the power units of said plurality of power units. In one embodiment, the second panel includes a second plurality of contact elements (terminal). Each contact element (terminal) of said second plurality of contact elements (terminals) is in contact with the second electrode of a corresponding power unit.

It should be noticed that the "contact element" will be referred to in this description using the term "terminal" without thereby limiting the protective scope, relative to the expression "contact element". The contact element, that is to say, the terminal, may be any "contact", "sheet" or "tab". In one embodiment, the first panel comprises a first plurality of holes. Each hole of said first plurality is aligned, along the longitudinal direction, with a respective terminal of the first plurality of terminals. Each hole of said first plurality is aligned, along the longitudinal direction, with a respective terminal of the first plurality of terminals and with a respective first electrode. In one embodiment, the second panel comprises a second plurality of holes. Each hole of said second plurality is aligned, along the longitudinal direction, with a respective terminal of the second plurality of terminals. Each hole of said second plurality is aligned, along the longitudinal direction, with a respective terminal of the second plurality of terminals and with a respective second electrode.

This characteristic allows access to contact zones between the first plurality of terminals and the first electrodes (and to contact zones between the second plurality of terminals and the second electrodes) from an environment faced by an outside surface of the first panel (and/or of the second panel), opposite to the inside surface. That characteristic allows automation of a process of assembly of the power units and therefore reduces their assembly times.

In one embodiment, the first panel includes a first printed circuit board. The first printed circuit board of the first panel is connected to the first plurality of terminals. In one embodiment, the second panel includes a second printed circuit board. The second printed circuit board of the second panel is connected to the second plurality of terminals.

The presence of printed circuit boards on the panels allows a reduction in the power unit wiring operations, since it allows the obtainment of panels in which the electric paths have already been provided.

In one embodiment, the power module comprises a control unit. The control unit is configured to control an electric power supplied by the electric power module (that is to say, to monitor the status of the electric power unit and to regulate its charge status). The control unit is configured to regulate the electric power supplied by the electric power module. The power module comprises a first connector. The power module comprises a second connector.

In one embodiment, the control unit is connected to the first plurality of terminals by the first connector. In one embodiment, the control unit is connected to the second plurality of terminals by the second connector. In one embodiment, the control unit is connected to the first plurality of terminals by the first connector and the first printed circuit board. In one embodiment, the control unit is connected to the second plurality of terminals by the second connector and the second printed circuit board.

In one embodiment, the electric power module comprises a temperature sensor. The temperature sensor is configured to detect a temperature of the electric power module. The temperature sensor is connected to the control unit. In one embodiment, the temperature sensor is connected to the control unit by the first printed circuit board and/or the first connector. In one embodiment, the temperature sensor is connected to the control unit by the second printed circuit board and/or the second connector.

The temperature sensor is connected to the control unit to send it control signals. The control signals, in that embodiment, represent the temperature of the electric power module. In one embodiment, the temperature sensor is on the printed circuit board of the panel, close to the electrode, in such a way as to be able to measure its temperature at the point of contact between electrode and sheet.

The presence of a temperature sensor allows feedback about the temperature of the module as a function of which it is possible to consider any corrective action for the thermal status of the power module.

In one embodiment, the module includes a plurality of temperature sensors. Each temperature sensor of said plurality is associated with a respective electric power unit of said plurality of electric power units. Each temperature sensor of said plurality is connected to the control unit to send it a respective control signal representing the temperature of the respective electric power unit with which it is associated.

In one embodiment, each temperature sensor of said plurality is associated with a respective first or second electrode of a corresponding power unit. In that embodiment, for each power unit, the module has two temperature sensors, one for each of said first and second electrodes of the power unit.

That characteristic allows a precise temperature distribution, which is closely linked to a power unit. That is very advantageous for considering any precise thermal conditioning or for evaluating the operating status of a single power unit.

In one embodiment, the electric power module comprises a thermal conditioning system. The thermal conditioning system is configured to modify the temperature of the electric power module.

In one embodiment, the thermal conditioning system includes a fan. That fan is configured to direct an air flow towards said plurality of power units. In one embodiment, that air flow is directed in a transversal direction.

In one embodiment, the control unit is configured to generate drive signals. In general the drive signals are signals used to drive future actions of the components of the module which are connected to the control unit.

In one embodiment, the drive signals are a function of the control signals. In one embodiment, the drive signals are a function of the control signals of each temperature sensor of said plurality of temperature sensors. The control unit is configured to send said drive signals to the thermal conditioning system, for teaching it to regulate the temperature of the power module by feedback. Essentially, the control unit is configured to regulate the thermal conditioning system by feedback.

In one embodiment, the power module comprises a spacer. In one embodiment, the spacer is disposed between the inside surface of the first panel and the first ends of said plurality of electric power units. In one embodiment, the spacer is disposed between the inside surface of the second panel and the second ends of said plurality of electric power units.

In one embodiment, the power module comprises a first spacer. In one embodiment, the power module comprises a second spacer.

The first spacer is disposed between the inside surface of the first panel and the first ends of said plurality of electric power units. The second spacer is disposed between the inside surface of the second panel and the second ends of said plurality of power units.

The presence of the spacer (or of the spacers) allows the other parts of the power units to be kept isolated either from the first or the second panel and maintaining the electrical contact only at the first and the second electrode.

In one embodiment, the spacer includes a plate. Said plate comprises, for each electric power unit, a respective recess. Each recess is configured to receive the first end or the second end of the respective electric power unit. In one embodiment, said plate comprises, for each electric power unit, a respective through hole. That through hole is made inside the recess. The through hole is configured to allow the first or second electrode of the respective electric power unit to come into contact with the respective terminal of said first or second plurality of terminals of the first or second panel, respectively.

In one embodiment, the power module comprises a plurality of tie rods. Said plurality of tie rods is coupled to said first and second panel. In particular, said first and second panel include a first plurality of assembly holes and a second plurality of assembly holes, respectively. The plurality of tie rods is connected to the first plurality of assembly holes of the first panel. The plurality of tie rods is connected to the second plurality of assembly holes of the second panel. Said plurality of tie rods is coupled to said first and second panel to keep the plurality of power units in an assembly position. In one embodiment, said assembly position is the position in which the electrical connections will be made between the first and second pluralities of terminals and the respective first or second electrodes of the power units.

In one embodiment, the terminals of the first and second pluralities of terminals include respective tabs. Said tabs are connected to the inside surface of the first panel and second panel. Said tabs protrude from the inside surface of the first panel and second panel. In particular, said tabs include a first end, connected to the inside surface of the first panel and second panel. In particular, said tabs include a second end, connected to the inside surface of the first panel and second panel. The part of the tabs disposed between the first end and second end is not in contact with the inside surface of the first panel and second panel, instead protruding relative to it along the longitudinal direction. The part of the tabs disposed between the first end and second end passes over a respective hole of said first plurality and second plurality of holes of the first panel and second panel.

According to one aspect of this description, this invention also provides an electric power system. In one embodiment, the electric power system is an integrated electric power system. Said integrated electric power system comprises a plurality of electric power modules according to any of the characteristics described in this invention. Said plurality of electric power modules are connected to each other to provide a supply current for a supply voltage.

The integrated electric power system comprises a supervising unit. Said supervising unit is connected to each control unit of said plurality of power modules to receive the respective control signals. In one embodiment, at least two power modules of said plurality of electric power modules are connected to each other in parallel. In one embodiment, at least two electric power modules of said plurality of electric power modules are connected to each other in series.

In one embodiment, a plurality of power modules of said integrated system defines an electric power block. The integrated system may comprise a serial block, in which the power units are connected to each other in series. The integrated system may comprise a parallel block, in which the power units are connected to each other in parallel.

Each integrated power block may include a respective management unit, configured to gather the control signals of each electric power module belonging to the block. The management units of the integrated electric power system are connected to the supervising unit.

In one embodiment, a first parallel block may be connected in series to a second parallel block. In one embodiment, a first serial block may be connected in parallel to a second serial block.

In one embodiment, the integrated power system comprises a plurality of panels. In one embodiment, said plurality of panels are oriented perpendicularly relative to the first and to the second panel or panels which correspond to the electric power modules (at least one module) of the integrated power system. In one embodiment, each panel of said plurality of panels includes one or more of the following components:

A plurality of connectors, configured to allow the electrical connection between the control units of the electric power modules and the supervising unit.

A printed circuit board, configured to allow the electrical connection between the control units of the electric power modules and the supervising unit.

At least one mechanical connector, configured to allow the mechanical connection between the power modules of the integrated power system.

In one embodiment, at least one part of the conditioning system is interposed, along the longitudinal direction, between two panels of said plurality of panels. In particular, in one embodiment, the fan of the thermal conditioning system is kept between two panels of said plurality of panels, in a position transversally aligned with the power units of a power module. According to one aspect of this invention, the method also provides a method for assembling an electric power module.

In one embodiment, the method comprises a step of preparing a plurality of electric power units, each of which extends along a longitudinal direction from a first end, including a first electrode, to a second end, including a second electrode. In one embodiment, the method comprises a step of positioning said plurality of electric power units between a first panel, including a first plurality of terminals, and a second panel, including a second plurality of terminals. Each terminal of said first plurality is in contact with the first electrode of a corresponding electric power unit to define first soldering zones. Each terminal of said second plurality is in contact with the second electrode of a corresponding power unit to define second soldering zones.

In one embodiment, the method comprises a step of first soldering between the first plurality of terminals and the first electrodes of the plurality of electric power units. That step of first soldering occurs at the first soldering zones. That step of first soldering makes an electrical connection between the first electrodes and the respective terminals of the first panel.

In one embodiment, the method comprises a step of second soldering between the second plurality of terminals and the second electrodes of the plurality of electric power units. That step of second soldering occurs at the second soldering zones. That step of second soldering makes an electrical connection between the second electrodes and the respective terminals of the second panel.

This integration of the power units allows high power levels in small spaces with rapid assembly processes.

In one embodiment, in the step of first soldering, the first soldering zones are accessible through a first plurality of holes. Each hole of said first plurality is aligned, along the longitudinal direction, with a respective terminal of said first plurality of terminals.

In one embodiment, in the step of second soldering, the second soldering zones are accessible through a second plurality of holes. Each hole of said second plurality is aligned, along the longitudinal direction, with a respective terminal of said second plurality of terminals.

This allows soldering technologies access to the first and second soldering zones from an environment outside the first and second panels. The easy access allowed by the first and second plurality of holes allows considerable automation of the assembly process, which greatly reduces the time required for it and therefore the related costs.

In one embodiment, the method comprises a step of fixing the first panel to the second panel. In one embodiment, said fixing step may occur by attaching a plurality of tie rods. Said plurality of tie rods are first inserted in a first plurality of assembly holes which are disposed in the first panel and then in a second plurality of assembly holes which are disposed in the second panel (or vice versa). That fixing steps allows the plurality of electric power units to be kept in an assembly position.

In one embodiment, the step of first soldering and/or the step of second soldering are done by laser soldering.

That soldering technology allows a further reduction in assembly times.

According to one aspect of this description, this invention also provides a method for assembling an integrated power system.

That method includes a step of preparing a plurality of electric power modules according to any of the characteristics described in this document. That method includes a step of preparing a plurality of panels.

In one embodiment, the method comprises a connecting step, in which at least one panel of said plurality of panels is connected to at least one power module of said plurality of power modules. In one embodiment, in the connecting step, at least one panel of said plurality of panels is connected to at least two power modules of said plurality.

In one embodiment, in the connecting step, at least two panels of said plurality of panels is connected to at least two power modules of said plurality. In that embodiment, each panel of said at least two panels is disposed on opposite sides of the module of the two power modules along the transversal direction.

BRIEF DESCRIPTION OF THE DRAWINGS

In one embodiment, the method comprises a step of positioning a conditioning system. In that positioning step, a conditioning system (a fan) is interposed, along the longitudinal direction, between two panels of said plurality of panels. This and other characteristics will become more apparent in the following description of a preferred, non-limiting embodiment, illustrated by way of example only in the accompanying drawings, wherein:

FIG. 1 schematically illustrates a first side view of an electric power module;

FIG. 1A schematically illustrates a detail of a contact between an electrode of a battery of the module of FIG. 1 and a terminal of a panel of the module of FIG. 1;

FIGS. 2A and 2B schematically illustrate a first embodiment and a second embodiment of a part of the module of FIG. 1, respectively;

FIGS. 5A and 5B schematically illustrate an inside surface and an outside surface of a second panel of the module of FIG. 1, respectively;

FIG. 6 schematically illustrates a plan view of a spacer of the module of FIG. 1;

FIG. 8 schematically illustrates an embodiment of the interconnection between the modules of the power system of FIG. 7;

FIG. 9 schematically illustrates a panel of the power system of FIG. 7.

DETAILED DESCRIPTION OF PREFERRED EMBODIMENTS OF THE INVENTION

Figure 3B:
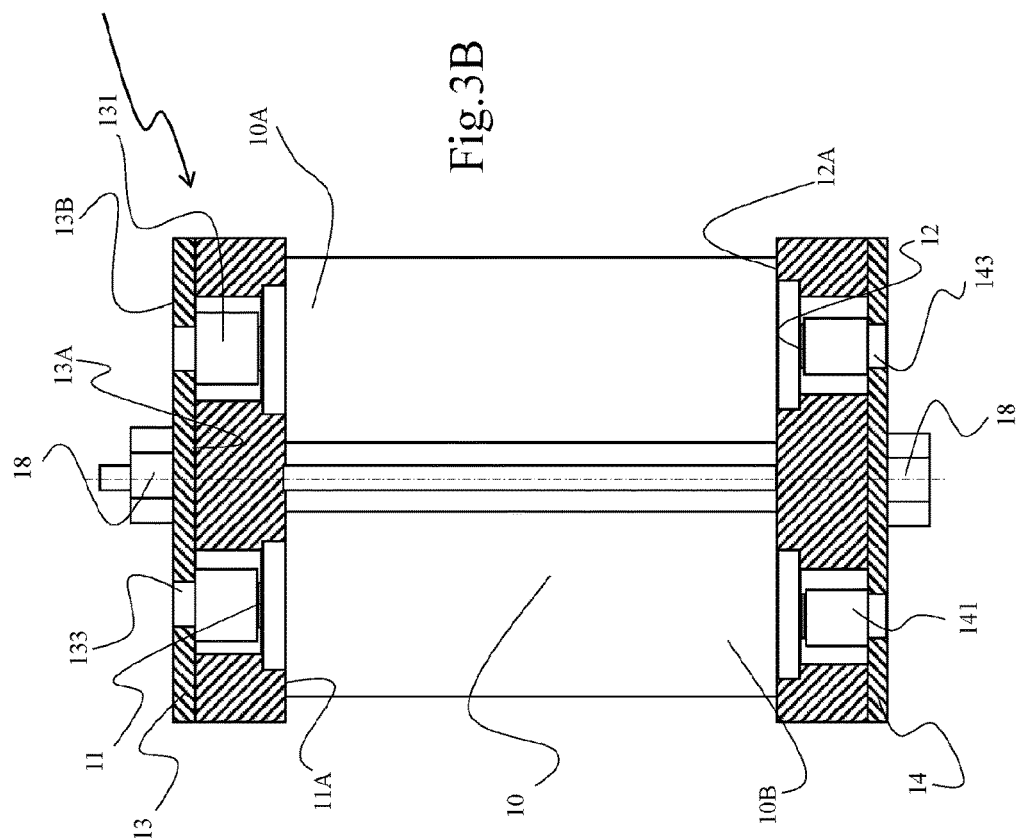
FIGS. 3A and 3B schematically illustrate a second side view of the module of FIG. 1 and a second side section view of the module of FIG. 1, respectively.
Figure 3A:
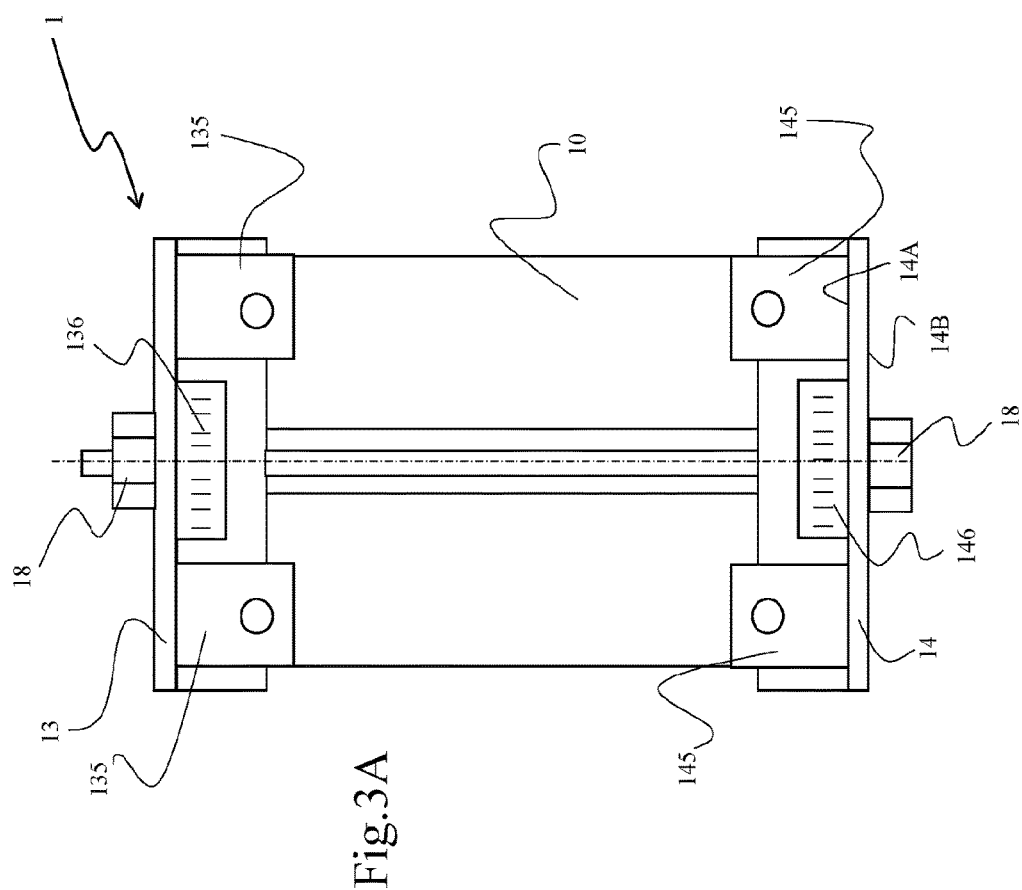
Figure 4B:
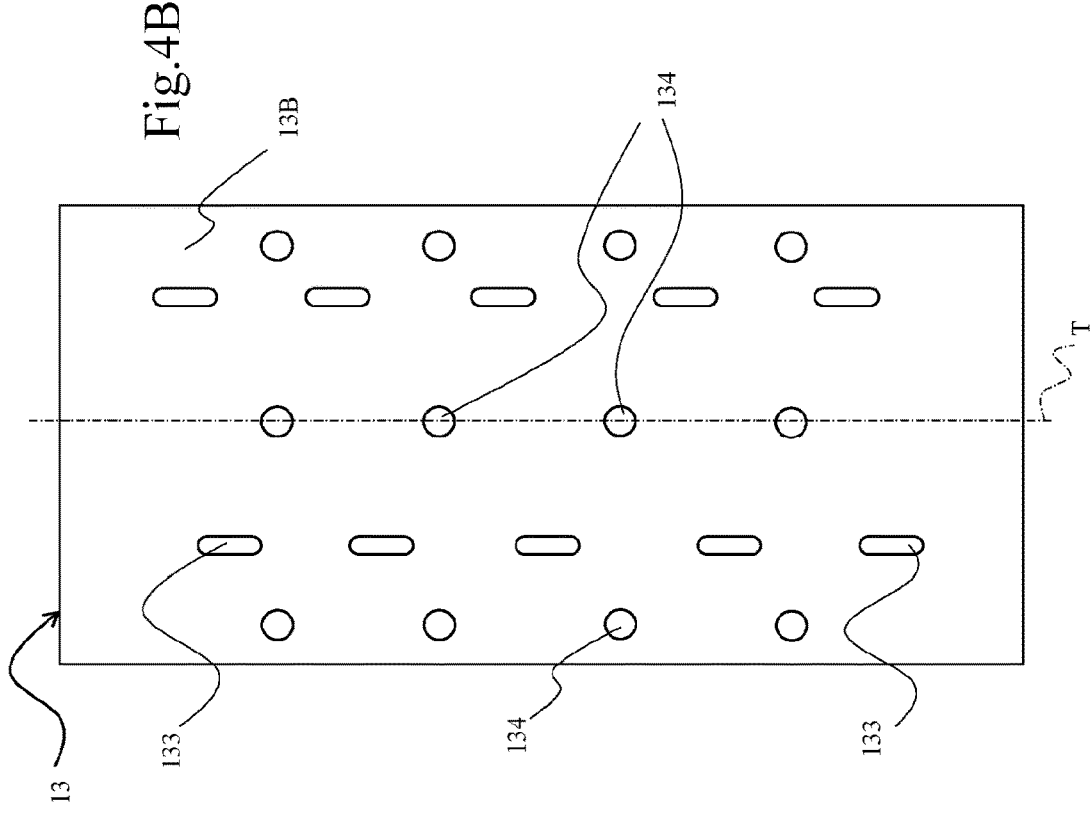
FIGS. 4A and 4B schematically illustrate an inside surface and an outside surface of a first panel of the module of FIG. 1, respectively.
Figure 4A:
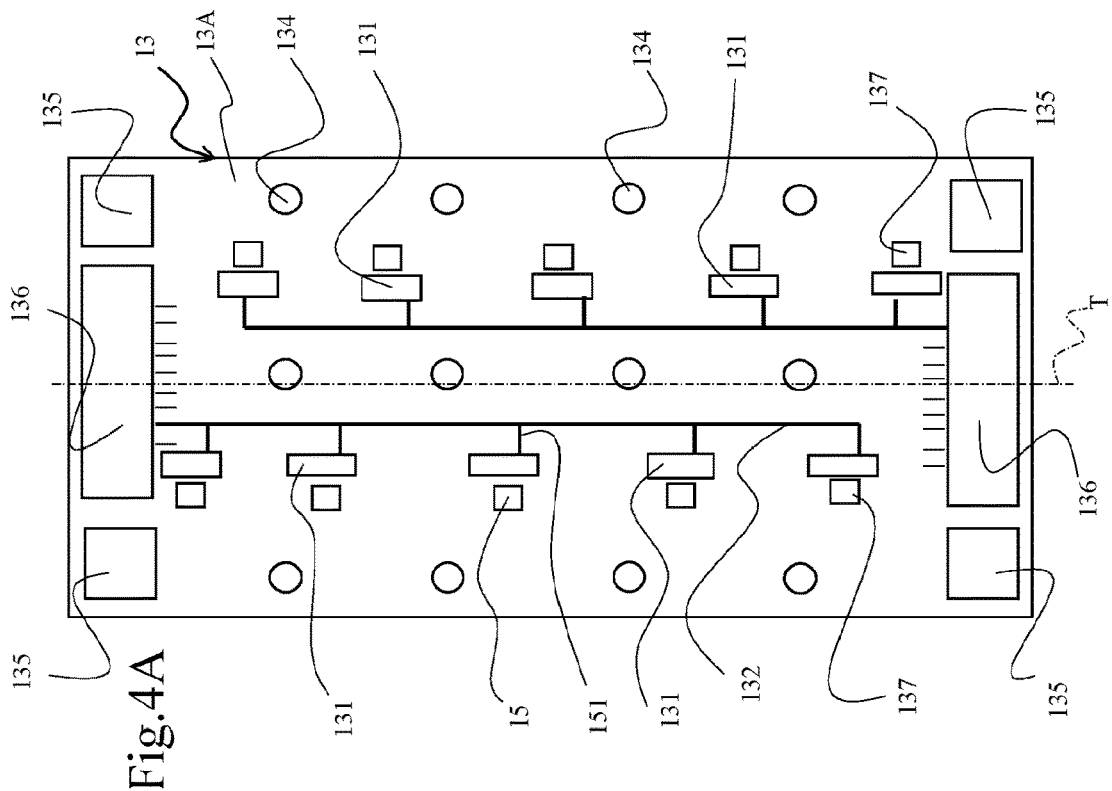
Figure 7:
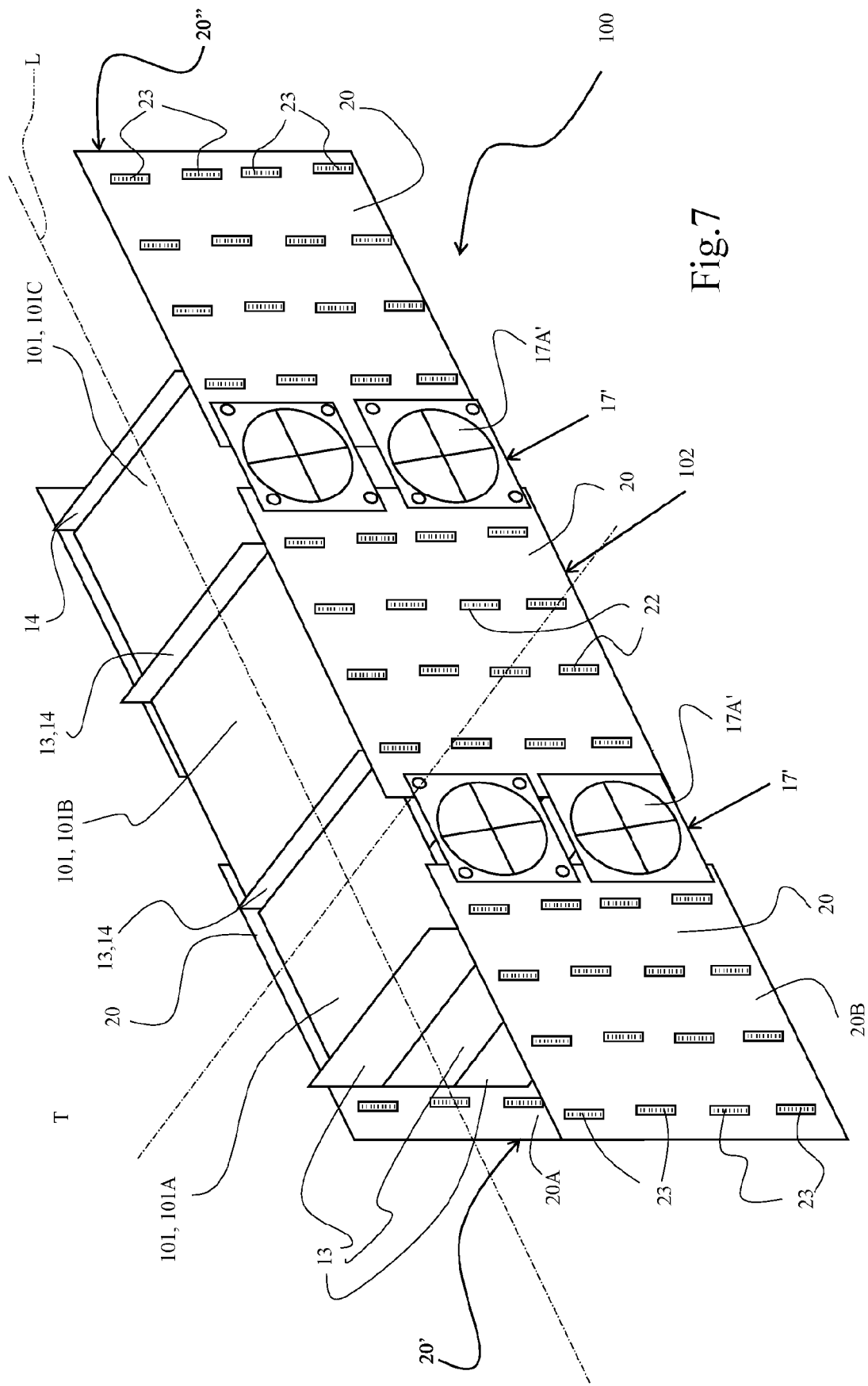
FIG. 7 schematically illustrates an integrated electric power system.

With reference to the accompanying drawings, the numeral 1 denotes an electric power module. The module 1 includes a plurality of power units. In one embodiment, the plurality of power units is a plurality of batteries 10. In one embodiment the batteries 10 of said plurality are cylindrical batteries. Each battery 10 of said plurality extends along a longitudinal direction L. Each battery 10 of said plurality includes a first end 10A. Each battery 10 of said plurality includes a second end 10B. Each of said first end 10A and second end 10B of the battery 10 includes a first electrode 11 and a second electrode 12, respectively. Hereinafter reference will be made to the first electrode 11 of the battery 10 with the term anode 11. Hereinafter reference will be made to the second electrode 12 of the battery 10 with the term cathode 12. Each of said first end 10A and second end 10B of the battery 10 includes a first contact surface 11A and a second contact surface 12A, respectively. In one embodiment, the anode 11 protrudes relative to the first contact surface 11A in the longitudinal direction L. In one embodiment, the cathode 12 protrudes relative to the second contact surface 12A in the longitudinal direction L. It should be noticed that, in one embodiment, the anode 11 and the cathode 12 are coplanar with the first contact surface 11A and with the second contact surface 12A, respectively. In one embodiment, the batteries 10 of said plurality are juxtaposed with each other transversally, that is to say, along a transversal direction T, perpendicular to the longitudinal direction L.

In one embodiment, the module 1 comprises a first panel 13.

In one embodiment, the first panel 13 is at least partly made of insulating material. In one embodiment, the first panel 13 includes an inside surface 13A and an outside surface 13B. In one embodiment, the inside surface 13A (and the outside surface 13B) are perpendicular to the longitudinal direction L.

The inside surface 13A is facing said plurality of batteries 10. The inside surface 13A is facing the anodes 11 of said plurality of batteries 10. The outside surface 13B is opposite to the inside surface 13A and is facing an outside environment.

In one embodiment, the first panel 13 includes a first plurality of terminals 131. Said first plurality of terminals 131 is made of electrically conductive material. Each terminal 131 of said first plurality is configured to come into contact with a respective anode 11 of a corresponding battery 10 of said plurality of batteries. There may be many embodiments of said first plurality of terminals 131.

In one embodiment, said first plurality of terminals 131 is connected to the inside surface 13A of the first panel 13. Said first plurality of terminals 131 protrudes from the inside surface 13A of the first panel 13. In one embodiment, said first plurality of terminals 131 includes a first plurality of tabs. In one embodiment, each terminal 131 of said first plurality includes a first end 131A. In one embodiment, each terminal 131 of said first plurality includes a second end 131B. Each terminal 131 of said first plurality is connected to the inside surface 13A in its first end 131A. Each of said first end 131A and second end 131B of the terminals 131 is connected to the electrical circuit of the panel 13A, by surface mount technology (SMT). Each terminal 131 of said first plurality is connected to the inside surface 13A in its second end 131B. Each terminal 131 of said first plurality, starting from the first end 131A (where it is connected to the inside surface 13A) protrudes (rises up), along the longitudinal direction L, relative to the inside surface 13A then reconnects with it in the second end 131B of the terminal 131. Each terminal 131 of said first plurality includes a contact portion 131C, located between the first end 131A and the second end 131B and configured to come into contact with the respective anode 11.

In other embodiments, each terminal 131 of said first plurality is integrated in the first panel 13, in such a way as to fill a respective through hole made in the first panel 13. In that embodiment, the contact portion 131C of the terminal may be made as an excess of material which protrudes from said through hole towards the respective anode 11.

In one embodiment, the contact between each terminal 131 of said first plurality and the respective anode 11 defines first soldering zones S1, intended to be subsequently soldered so as to finalize assembly of the module 1. In one embodiment, each terminal 131 of said first plurality and the respective anode 11 are soldered so as to make an electrical connection.

In one embodiment, the first panel 13 includes a first printed circuit board 132. The first printed circuit board 132 allows wiring of said first plurality of terminals 131. The first printed circuit board 132 includes a plurality of tracks, configured to transmit, by means of said first plurality of terminals 131, the electric power of the plurality of batteries 10 to an external device which uses it. The plurality of tracks may be made either on the inside surface 13A or on the outside surface 13B provided that they are then connected to the first plurality of terminals 131.

The plurality of tracks may also be made in internal layers of the printed circuit board 13 located between the outside surface 13B and the inside surface 13A.

In one embodiment, the first panel 13 comprises a first plurality of holes (slots) 133. In one embodiment, said first plurality of holes 133 is through holes and goes through the first panel 13 from the outside surface 13B to the inside surface 13A.

Each hole 133 of said first plurality is aligned, along the longitudinal direction L, with a respective terminal 131 of the first plurality of terminals. Each hole 133 of said first plurality is aligned, along the longitudinal direction L, with a respective anode 11. This alignment between a hole 133 of said first plurality and the respective first soldering zone S1, defined by the contact between the corresponding anode 11 and the corresponding terminal 131 of said first plurality, allows access to the first soldering zone S1 for soldering systems (automatic).

In one embodiment, the first panel 13 comprises a first plurality of assembly holes 134. In one embodiment, said first plurality of assembly holes 134 is through holes and goes through the first panel 13 from the outside surface 13B to the inside surface 13A.

In one embodiment, said first plurality of assembly holes is evenly distributed on the first panel 13.

In one embodiment, the first panel 13 comprises at least one mechanical connector 135. Said at least one mechanical connector 135 is configured to allow the module 1 to be connected to other modules 1 in an integrated power system. Said at least one mechanical connector 135 is connected on the inside surface 13A of the first panel 13. In one embodiment, the first panel 13 includes four mechanical connectors 135. In one embodiment, two of said four mechanical connectors 135 are disposed on the inside surface 13A at a side of the first panel perpendicular to the transversal direction T. The remaining two mechanical connectors 135 are disposed on the inside surface 13A at a side of the first panel 13 opposite to the side where the other two mechanical connectors are disposed.

In one embodiment, the first panel 13 comprises at least one electrical connector 136. Said at least one electrical connector 136 is configured to allow the module 1 to transmit electrical signals. Said at least one electrical connector 136 is connected on the inside surface 13A of the first panel 13. In one embodiment, the first panel 13 includes two electrical connectors 136. In one embodiment, one of the two electrical connectors 136 is disposed on the inside surface 13A at a side of the first panel perpendicular to the transversal direction T. The other electrical connector 136 is disposed on the inside surface 13A at a side of the first panel 13 opposite to the side where the other electrical connector is disposed. In one embodiment, one of the two electrical connectors 136 is used to transfer the electrical signals arriving from a first part of said first plurality of terminals 131. In contrast, the other electrical connector 136 is used to transfer the electrical signals arriving from the remaining part of said first plurality of terminals 131.

In one embodiment, the first panel 13 comprises an electrical power connector. The electrical power connector is configured to transmit the electric power stored in the plurality of batteries 10 to an external electrical load. In one embodiment, the electrical power connector and the mechanical connector 135 are integrated.

In one embodiment, the module 1 comprises a thermal conditioning system 17. The thermal conditioning system 17 is configured to modify the temperature of the module 1. In one embodiment, the thermal conditioning system includes a fan 17A. The fan 17A is configured to generate a flow of coolant fluid (for example air) in a transversal direction T, in such a way that said flow moves across all of the batteries 10 of said plurality.

In one embodiment, the module 1 comprises a control unit 16. The control unit is connected to the first plurality of terminals 131 by said at least one electrical connector 136. The control unit is connected to the first plurality of terminals 131 by said first printed circuit board 132. The control unit 16 is configured to manage the operations of the module 1. In particular, in one embodiment, the control unit is configured to perform one or more of the following operations:

Measure the voltage of the module 1;
Receive control signals 151 to monitor a temperature of the anode 11 and of the cathode 12 of each battery 10;
Send drive signals, as a function of the control signals 151, to the thermal conditioning system 17;
Connect to other control units 16 of further modules 1 which may be connected to the module 1;
Allow electrical charging of the module 1;
Evaluate the status of each battery, in particular the condition of each electrode of each battery, as a function of the control signals 151.

In one embodiment, the module 1 comprises (at least) one temperature sensor 15. The temperature sensor 15 is configured to detect a temperature of the module 1. The temperature sensor is configured to generate the control signals 151, which represent the temperature of the module 1. The temperature sensor 15 is configured to transmit the control signals 151 to the control unit.

In one embodiment, the first panel 13 includes a first plurality of temperature sensors 137. Each temperature sensor 137 is associated with a respective anode 11 of a corresponding battery 10. Each temperature sensor 137 is configured to generate respective control signals 151, which represent the temperature of the respective anode 11 of the corresponding battery 10. Each temperature sensor 137 is configured to transmit the respective control signals 151 to the control unit. Each temperature sensor 137 is mounted by soldering on the printed circuit board of the lower surface 13A, 14A of the first panel 13 and/or the second panel 14, close to the point of contact (or soldering) between a terminal 131 and a respective anode 11 and/or a respective cathode 12.

In one embodiment, the control unit is connected to said first plurality of temperature sensors 137 by said at least one electrical connector 136 and/or by said first printed circuit board 132.

In one embodiment both of the electrical connectors 136 are used to transfer the electrical signals arriving from the plurality of temperature sensors 137 and to carry power supplies and communication lines (fieldbus) for interconnecting the control modules 20 located at the ends of the module 1.

In one embodiment, the control unit is configured to generate the drive signals to be sent to the thermal conditioning system 17 as a function of the control signals 151 sent by the first plurality of temperature sensors. That allows generation of the drive signals while taking into consideration a more precise thermal distribution, with the consequent possibility of better directing the flow of coolant fluid of the thermal conditioning system 17.

In one embodiment, the module 1 comprises a second panel 14.

In one embodiment, the second panel 14 is at least partly made of insulating material. In one embodiment, the second panel 14 includes an inside surface 14A and an outside surface 14B. In one embodiment, the inside surface 14A (and the outside surface 14B) are perpendicular to the longitudinal direction L.

The inside surface 14A is facing said plurality of batteries 10. The inside surface 14A is facing the cathodes 12 of said plurality of batteries 10. The outside surface 14B is opposite to the inside surface 14A and is facing the outside environment.

In one embodiment, the second panel 14 includes a second plurality of terminals 141. Said second plurality of terminals 141 is made of electrically conductive material. Each terminal 141 of said second plurality is configured to come into contact with a respective cathode 12 of a corresponding battery 10 of said plurality of batteries. There may be many embodiments of said second plurality of terminals 141.

In one embodiment, said second plurality of terminals 141 is connected to the inside surface 14A of the second panel 14. Said second plurality of terminals 141 protrudes from the inside surface 14A of the second panel 14. In one embodiment, said second plurality of terminals 141 includes a second plurality of tabs. In one embodiment, each terminal 141 of said second plurality includes a first end 141A. In one embodiment, each terminal 141 of said second plurality includes a second end 141B. Each terminal 141 of said second plurality is connected to the inside surface 14A in its first end 141A. Each terminal 141 of said second plurality is connected to the inside surface 14A in its second end 141B. Each terminal 141 of said second plurality, starting from the first end 141A (where it is connected to the inside surface 14A) protrudes (rises up), along the longitudinal direction L, relative to the inside surface 14A then reconnects with it in the second end 141B of the terminal 141. Each terminal 141 of said second plurality includes a contact portion 141C, located between the first end 141A and the second end 141B and configured to come into contact with the respective cathode 12.

In other embodiments, each terminal 141 of said second plurality is integrated in the second panel 14, in such a way as to fill a respective through hole made in the second panel 14. In that embodiment, the contact portion 141C of the terminal may be made as an excess of material which protrudes from said through hole towards the respective cathode 12.

In one embodiment, the contact between each terminal 141 of said second plurality and the respective cathode 12 defines second soldering zones S2, intended to be subsequently soldered so as to finalize assembly of the module 1. In one embodiment, each terminal 141 of said second plurality and the respective cathode 12 are soldered so as to make an electrical connection.

In one embodiment, the second panel 14 includes a second printed circuit board 142. The second printed circuit board 142 allows wiring of said second plurality of terminals 141. The second printed circuit board 142 includes a plurality of tracks, configured to transmit, by means of said second plurality of terminals 141, the electric power of the plurality of batteries 10 to an external device which uses it. The plurality of tracks may be made either on the inside surface 14A or on the outside surface 14B provided that they are then connected to the second plurality of terminals 141.

In one embodiment, the second panel 14 comprises a second plurality of holes (slots) 143. In one embodiment, said second plurality of holes 143 is through holes and goes through the second panel 14 from the outside surface 14B to the inside surface 14A.

Each hole 143 of said second plurality is aligned, along the longitudinal direction L, with a respective terminal 141 of the second plurality of terminals. Each hole 143 of said second plurality is aligned, along the longitudinal direction L, with a respective cathode 12. This alignment between a hole 143 of said second plurality and the respective second soldering zone S2, defined by the contact between the corresponding cathode 12 and the corresponding terminal 141 of said second plurality, allows access to the second soldering zone S2 for soldering systems (automatic).

In one embodiment, the second panel 14 comprises a second plurality of assembly holes 144. In one embodiment, said second plurality of assembly holes 144 is through holes and goes through the first panel 14 from the outside surface 14B to the inside surface 14A.

In one embodiment, said second plurality of assembly holes 144 is evenly distributed on the second panel 14.

In one embodiment, the second panel 14 comprises at least one mechanical connector 145. Said at least one mechanical connector 145 is configured to allow the module 1 to be connected to other modules 1 in an integrated power system. Said at least one mechanical connector 145 is connected on the inside surface 14A of the second panel 14. In one embodiment, the second panel 14 includes four mechanical connectors 145. In one embodiment, two of said four mechanical connectors 145 are disposed on the inside surface 14A at a side of the second panel 14 perpendicular to the transversal direction T. The remaining two mechanical connectors 145 are disposed on the inside surface 14A at a side of the second panel 14 opposite to the side where the other two mechanical connectors 145 are disposed.

In one embodiment, the second panel 14 comprises at least one electrical connector 146. Said at least one electrical connector 146 is configured to allow the module 1 to transmit electrical signals. Said at least one electrical connector 146 is connected on the inside surface 14A of the second panel 14. In one embodiment, the second panel 14 includes two electrical connectors 146. In one embodiment, one of the two electrical connectors 146 is disposed on the inside surface 14A at a side of the second panel perpendicular to the transversal direction T. The other electrical connector 146 is disposed on the inside surface 14A at a side of the second panel 14 opposite to the side where the other electrical connector 146 is disposed. In one embodiment, one of the two electrical connectors 146 is used to transfer the electrical signals arriving from a first part of said second plurality of terminals 141. In contrast, the other electrical connector 146 is used to transfer the electrical signals arriving from the remaining part of said second plurality of terminals 141.

In one embodiment both of the electrical connectors 146 are used to transfer the electrical signals arriving from the second plurality of temperature sensors 147 and to carry power supplies and communication lines (fieldbus) for interconnecting the control modules 20 located at the ends of the module 1.

In one embodiment, the second panel 14 comprises an electrical power connector. The electrical power connector is configured to transmit the electric power stored in the plurality of batteries 10 to an external electrical load. In one embodiment, the electrical power connector and the mechanical connector 145 are integrated.

In one embodiment, the second panel 14 includes a second plurality of temperature sensors 147. Each temperature sensor 147 of said second plurality is associated with a respective cathode 12 of a corresponding battery 10. Each temperature sensor 147 of said second plurality is configured to generate respective control signals 151, which represent the temperature of the respective cathode 12 of the corresponding battery 10. Each temperature sensor 147 of said second plurality is configured to transmit the respective control signals 151 to the control unit.

In one embodiment, the control unit is connected to said second plurality of temperature sensors 147 by said at least one electrical connector 146 and/or by said second printed circuit board 142.

In one embodiment, the control unit is configured to generate the drive signals to be sent to the thermal conditioning system 17 as a function of the control signals 151 sent by the second plurality of temperature sensors.

The control unit is connected to the first plurality of terminals 131 by said at least one electrical connector 136. The control unit is connected to the first plurality of terminals 131 by said first printed circuit board 132.

In one embodiment, the module 1 comprises a plurality of tie rods 18. Said plurality of tie rods is configured to keep the module 1 in an assembly position, in which each terminal 131 of said first plurality of terminals is in contact with the respective anode 11 and in which each terminal 141 of said second plurality of terminals is in contact with the respective cathode 12.

In one embodiment, said plurality of tie rods 18 is inserted in said first plurality of assembly holes 134 and in said second plurality of assembly holes 144. In one embodiment, the module 1 comprises at least one spacer 19. In one embodiment, the spacer 19 is disposed between the inside surface 13A of the first panel 13 and the first ends 10B of said plurality of batteries 10. In one embodiment, the spacer 19 is disposed between the inside surface 14A of the second panel 14 and the first ends 10B of said plurality of batteries 10.

In one embodiment, the spacer 19 comprises at least one recess 191. In one embodiment, the spacer 19 comprises a plurality of recesses 191, each associated with a respective battery 10 of said plurality. In one embodiment, the spacer 19 comprises, for each recess 191, a respective through hole 192. Each through hole 192 allows the anode 11 or the cathode 12 of a respective battery 10 to come into contact with the corresponding terminal 131 of said first plurality or with the corresponding terminal 141 of said second plurality.

In one embodiment, a surface of the recess 191, perpendicular to the longitudinal direction L and in which the through hole 192 is made, is configured to make contact with the first contact surface 11A of the first end 10A of the corresponding battery 10.

In one embodiment, a surface of the recess 191, perpendicular to the longitudinal direction L and in which the through hole 192 is made, is configured to make contact with the second contact surface 12A of the second end 10B of the corresponding battery 10.

It should be noticed that each through hole 194 made in the spacer 19 allows a space to be made inside which one or more of the following elements is disposed:

A terminal 131 of said plurality of terminals;
A terminal 141 of said second plurality of terminals;
A temperature sensor.

In one embodiment, the space remaining between the first panel 13 or the second panel 14 and the power unit (due to the presence of the spacer 19) is filled with heat-conducting material which allows the temperature sensor to measure the temperature of the contact between the terminal 131 of said first plurality or the terminal 141 of said second plurality and the anode 11 or cathode 12. In one embodiment, for example, heat-conducting silicone is used, configured to electrically insulate but thermally conduct.

In one embodiment, the module 1 comprises a first spacer 19A. In one embodiment, the module 1 comprises a second spacer 19B. The first spacer 19A is disposed between the plurality of batteries 10 and the inside surface 13A of the first panel 13. The second spacer 19B is disposed between the plurality of batteries 10 and the inside surface 14A of the second panel 14.

In one embodiment, the first spacer 19A may be fixed to the first panel 13 by attaching glue. In one embodiment, the second spacer 19B may be fixed to the second panel 14 by attaching glue.

Each of said first spacer 19A and second spacer 19B include a first plurality of recesses 191A and a second plurality of recesses 191B, respectively.

Each of said first spacer 19A and second spacer 19B include a first plurality of through holes 192A and a second plurality of through holes 192B, respectively.

Each recess 191A of said first plurality is configured to receive the first end 10A of a respective battery 10. Each recess 191B of said second plurality is configured to receive the second end 10B of a respective battery 10. In particular, in one embodiment, the first contact surface 11A of the first end 10A of the corresponding battery 10 makes contact with the surface of the corresponding recess 191A of said first plurality perpendicular to the longitudinal direction L. Moreover, the second contact surface 12A of the second end 10B of the corresponding battery 10 makes contact with the surface of the corresponding recess 191B of said second plurality perpendicular to the longitudinal direction L.

Each through hole 192A of said first plurality allows the anode 11 of a respective battery 10 to come into contact with the corresponding terminal 131 of said first plurality. Each through hole 192B of said second plurality allows the cathode 12 of a respective battery 10 to come into contact with the corresponding terminal 141 of said second plurality.

Each of said first spacer 19A and second spacer 19B include a plurality of holes 194A and 194B used for the passage of the plurality of tie rods 18. According to one aspect of this description, this invention also intends to protect an integrated electric power system 100.

The system 100 includes a plurality of modules 1 according to any of the characteristics previously described. The modules 1 of said plurality are connected to each other in order to increase, as a function of the specific requirements, the voltage of the system 100 or the capacity of the system 100. In particular, in order to increase the voltage, a part of said plurality of modules 1 may be connected in series. In contrast, in order to increase the capacity, a part of said plurality of modules 1 may be connected in parallel.

In one embodiment, the system 100 includes a power block 101. The power block 101 includes at least one part of said plurality of modules 1 of the system 100. The modules 1 belonging to the block 101 may be connected in series or in parallel. In one embodiment, the system includes a plurality of blocks 101. The blocks 101 of said plurality may in turn be connected in series or in parallel.

In a preferred embodiment, the modules 1 of a block 101 are connected in parallel. In that preferred embodiment, the blocks 101 of a system 100 are connected in series. Finally, in some embodiments, the system 100 comprises a further degree of modularization. In that embodiment, the blocks 101 are grouped in strings 102. In a preferred embodiment, the strings 102 are connected to each other in parallel.

In one embodiment, the modules 1 of a block 101 are disposed and juxtaposed with each other along a direction perpendicular to the longitudinal direction L and to the transversal direction T. In one embodiment, the blocks 101 of the system 100 (or of the strings 102) are juxtaposed with each other along the longitudinal direction L.

In the embodiment in which the modules 1 are grouped in blocks 101, it is possible to have sharing of the control unit 16. Essentially, each module 1 of the block 101 sends the respective control signals 151 to a single management unit 16' (shared by all of the modules 1 of the block 101). In the embodiment in which the modules 1 are grouped in blocks 101, it is possible to have sharing of the thermal conditioning system 17. In particular, each block 101 comprises a respective thermal conditioning system 17'. In one embodiment, the thermal conditioning system 17' of the block 101 comprises at least one fan 17A'.

In one embodiment, each block includes its own management unit 16'. As already indicated, the management unit 16' of the block 101 may coincide with the control unit 16 of the modules 1. In one embodiment, each string 102 includes its own management unit, configured to control and receive the control signals 151 of all of the blocks which belong to the string 102. Finally, the power system 100 may comprise a supervising unit, configured to control and manage the power system.

In particular, the management unit of the block 101 is configured to perform one or more of the following operations:
- Measuring the voltage of the block 101;
- Receiving control signals 151 of all of the modules 1 to monitor a temperature of the anode 11 and of the cathode 12 of each battery 10 of each module 1;
- Sending drive signals, as a function of the control signals 151, to the thermal conditioning system 17' of each module 1;
- Electrical charging of the modules for equalising the voltage between the blocks 101;
- Sending to the supervising unit the status of each battery, in particular the condition of each electrode of each battery of each module, as a function of the control signals 151.

In one embodiment, the management unit of the string 102 is configured to perform one or more of the following operations:
- Equalising the modules 1 belonging to the blocks 101, by activating the equalisation circuits installed on each block 101;
- Activating the thermal conditioning system 17' (for example activating said at least one fan 17');
- Generating limiting signals for the user of the battery either in charging or in discharging mode;
- Sorting of the voltages of the blocks 101;
- Sorting of the temperatures of the batteries associated with the blocks 101.

In one embodiment, the supervising unit of the power system 100 is configured to perform one or more of the following operations:
- Collection of information about the individual batteries and generation of a report containing information about the entire power system 100;
- Generation of limiting signals or enabling signals for devices connected to the power system 100;
- Calculation of a charge status of the power system 100, which represents a remaining quantity of electric power;
- Estimation of the health status of the power system 100.

In one embodiment, the system 100 includes a plurality of panels 20. The plurality of panels 20 is configured to allow integration (mechanical and/or electronic) between the plurality of modules 1. The plurality of panels 20 is configured to allow integration (mechanical and/or electronic) between the plurality of blocks 101.

The following is a description of a single panel 20 of said plurality of panels 20, which also extends the same characteristics to the other panels of the plurality of panels 20.

The panel 20 includes an inside surface 20A, perpendicular to the transversal direction T and facing the modules 1. The panel 20 includes an outside surface 20B, perpendicular to the transversal direction T and opposite to the inside surface 20A.

In one embodiment, the panel 20 comprises the management unit 16' of a respective block to which it is connected. In one embodiment, the panel 20 is connected to the first panel 13 of the modules 1 which belong to a first block 101A. In one embodiment, the panel 20 is connected to the first panel 13 of the modules 1 which belong to a second block 101B. In one embodiment, the panel 20 is connected to the second panel 14 of the modules 1 which belong to a second block 101B.

In one embodiment, the panel 20 is connected to the second panel 14 of the modules 1 which belong to a third block 101C.

In one embodiment, the panel 20 includes a first plurality of electrical connectors 21. In one embodiment, the panel 20 includes a second plurality of electrical connectors 22. In one embodiment, the panel 20 includes a third plurality of electrical connectors 23.

In one embodiment, each electrical connector 21 of said first plurality is configured to connect the panel 20 to the respective second panel 14 of a module 1 which belongs to the first block 101A. In one embodiment, each electrical connector 22A of said second plurality is configured to connect the panel 20 to the respective first panel 13 of a module 1 which belongs to the second block 101B. In one embodiment, each electrical connector 22B of said second plurality is configured to connect the panel 20 to a respective second panel 14 of a module 1 which belongs to the second block 101B.

In one embodiment, each electrical connector 23 of said third plurality is configured to connect the panel 20 to a respective first panel 13 of a module 1 which belongs to the third block 101C.

In one embodiment the electrical circuit present on the panel 20 controls the modules 1 of the block 101B which are connected between the connectors 22A and 22B.

In one embodiment the electrical circuit made on each panel of said plurality 20 allows the passage of the power supplies and the data between control units 16 which belong to different blocks and the supervising unit.

In one embodiment, the panels 20 of said plurality are disposed in a first row 20' and in a second row 20". Each panel 20 of each of said first row 20' and second row 20" is at a distance, along the longitudinal direction L, from a subsequent panel and/or from a preceding panel of the corresponding row defining a longitudinal crack.

In one embodiment, the inside surfaces of each panel 20 of the first row 20' are facing the inside surfaces of each panel 20 of the second row 20". In one embodiment, the inside surfaces of each panel 20 of the first row 20' are aligned, along the transversal direction T, with the longitudinal crack defined by the distance between two panels 20 of the second row 20". In one embodiment, the inside surfaces of each panel 20 of the second row 20" are aligned, along the transversal direction T, with the longitudinal crack defined by the distance between two panels 20 of the first row 20'.

In one embodiment, the panel 20 includes a first plurality of electrical and mechanical connectors 235 which are electrically equipotential to each other. The first plurality 235A of that first plurality of electrical and mechanical connectors 235 is connected to the first plurality of electrical and mechanical connectors 135 present on the first panel 13 of the modules 1 which are connected and controlled of the device 16 of the same panel 20 and which form the block 101B. The second plurality 235A of that first plurality of electrical and mechanical connectors 235 is connected to the second plurality of electrical and mechanical connectors 145 present on the second panel 14 of the modules 1 which are connected to the panel 20 of the previous block 101A.

In one embodiment, the panel 20 includes a second plurality of electrical and mechanical connectors 245 which are electrically equipotential to each other. The first plurality 245A of that second plurality of electrical and mechanical connectors 245 is connected to the second plurality of electrical and mechanical connectors 145 present on the second panel 14 of the modules 1 which are connected and controlled of the device 16 of the same panel 20 and which form the block 101B. The second plurality 245A of that second plurality of electrical and mechanical connectors 245 is connected to the second plurality of electrical and mechanical connectors 135 present on the first panel 13 of the modules 1 which are connected to the panel 20 of the next block 101C.

In one embodiment, the plurality of panels 20 includes a plurality of fixing points 24.

In one embodiment, the connection of the circuits which integrate the modules 1 which belong to adjacent blocks 101, made by the connection pluralities 21 and 23, allows the connection in series of the power of the blocks 101 and the formation of the string 102.

In one embodiment the electrical circuit present on the panel 20 of the second block 101B controls the modules 1 of the block 101B which are connected between the connectors 22A and 22B.

In one embodiment the electrical circuit allows continuity of the electrical connection for power supplies and data transmission between control units 16 which belong to different blocks and the supervising unit. The same considerations also extend to all of the other blocks (for example, the first block 101A and third block 101C) of the power system.

In one embodiment, the thermal conditioning system 17' (said at least one fan 17A') is disposed in (occupies) the crack defined by the distance between two panels 20 of said first row 20A or between the crack defined by the distance between two panels 20 of said second row 20B. In one embodiment, the thermal conditioning system 17' is connected to at least one panel 20 of said plurality at said plurality of fixing points 24.

According to one aspect of this description, this invention provides a method for assembling an electric power module 1.

In one embodiment, the method comprises a step of preparing a plurality of (electric power units) batteries 10, each of which extends along a longitudinal direction L and includes a first end 10A, on which a first electrode (anode 11) is disposed, and a second end 10B, on which a second electrode (cathode 12) is disposed. In the step of preparing the plurality of batteries 10, the batteries 10 are juxtaposed with each other transversally (that is to say, along a transversal direction T perpendicular to the longitudinal direction L).

In one embodiment, the method comprises a step of positioning said plurality of batteries 10. In that positioning step, said plurality of batteries 10 is positioned between a first panel 13, including a first plurality of terminals 131, and a second panel 14, including a second plurality of terminals 141. In that positioning step, said first plurality of terminals 131 and second plurality of terminals 141 is disposed (connected) on a corresponding inside surface 13A, 14A of the first panel 13 and of the second panel 14 which is facing the plurality of batteries 10, respectively. In that positioning step, each of said terminals 131 of the first plurality touches a respective anode 11 of a corresponding battery 10, defining first soldering zones S1. In that positioning step, each of said terminals 141 of the second plurality touches a respective cathode 12 of a corresponding battery 10, defining second soldering zones S2.

In one embodiment, the method comprises a first soldering step. In that first soldering step, the first plurality of terminals 131 and the anodes 11 of the plurality of batteries 10 are soldered at the first soldering zones S1. The first soldering step allows an electrical connection to be made between each of said terminals 131 of the first plurality and the respective anode 11 of the corresponding battery 10. In one embodiment, the first soldering step is done by automatic soldering. In one embodiment, the first soldering step is done by laser soldering.

In one embodiment, in which the first panel 13 includes a first plurality of holes 133, each aligned along the longitudinal direction L with a respective terminal 131 of said first plurality, the first soldering step occurs by accessing the first soldering zones S1 through said first plurality of holes 133. This allows the method, in particular the first soldering step to be automated, knowing the distribution of said first plurality of holes 133 on the first panel 13.

In one embodiment, the method comprises a first connecting step. In that first connecting step, the terminals 131 of the first plurality are connected to a control (and measuring) unit 16 and to a power circuit created on the panel 20 by means of mechanical and electrical connections 135, for transferring the connection of all of the anodes 11 of the first panel 13 to the panel 20 of a respective power block.

In one embodiment, in that second connecting step, the terminals 131 of the first plurality are connected to the control unit 16 by means of at least one electrical connector 136, for transferring an electric power (of part of the batteries 10 of said plurality) to a device connected to the electric power module 1.

In one embodiment, the method comprises a second soldering step. In that second soldering step, the second plurality of terminals 141 and the cathodes 12 of the plurality of batteries 10 are soldered at the second soldering zones S2. The second soldering step allows an electrical connection to be made between each of said terminals 141 of the second plurality and the respective cathode 12 of the corresponding battery 10. In one embodiment, the second soldering step is done by automatic soldering. In one embodiment, the second soldering step is done by laser soldering.

In one embodiment, in which the second panel 14 includes a second plurality of holes 143, each aligned along the longitudinal direction L with a respective terminal 141 of said second plurality, the second soldering step occurs by accessing the second soldering zones S2 through said second plurality of holes 143. This allows the method, in particular the second soldering step to be automated, knowing the distribution of said second plurality of holes 143 on the second panel 14.

In one embodiment, the method comprises a second connecting step. In that second connecting step, the terminals 141 of the second plurality are connected to a measuring and control unit 16 and to a power circuit created on the panel 20 by means of mechanical and electrical connections 145, for transferring the connection of all of the cathodes 12 of the second panel 14 to the panel 20 of a respective power block.

In one embodiment, in that second connecting step, the terminals 141 of the second plurality are connected to the control unit 16 by means of at least one electrical connector 146, for transferring an electric power (of part of the batteries 10 of said plurality) to a device connected to the electric power module 1.

In one embodiment, the method comprises a step of thermal monitoring. In that step of thermal monitoring, a temperature sensor 15 measures at least one temperature of the module 1. In the step of thermal monitoring, the temperature sensor 15 generates control signals 151, which represent said at least one temperature of the module 1. The temperature sensor 15 sends the control signals 151 to the control unit 16.

In one embodiment, the step of thermal monitoring comprises a first step of thermal monitoring. In that first step of thermal monitoring, a first plurality of temperature sensors 137 measures a plurality of temperature values, each associated with a respective anode 11 of a corresponding battery 10, with which the temperature sensor is associated. In the first step of thermal monitoring, each temperature sensor 137 of said first plurality of temperature sensors generates corresponding control signals 151, which represent the temperature of the respective anode 11. Each temperature sensor 137 of said first plurality of temperature sensors sends the respective control signals 151 to the control unit 16. Said control signals are sent through the connector 136, which joins the first panel 13 to the panel 20 of the respective power block on which said control unit 16 can be mounted.

In one embodiment, the step of thermal monitoring comprises a second step of thermal monitoring. In that second step of thermal monitoring, a second plurality of temperature sensors 147 measures a plurality of temperature values, each associated with a respective cathode 12 of a corresponding battery 10, with which the temperature sensor is associated. In the second step of thermal monitoring, each temperature sensor 147 of said second plurality of temperature sensors generates corresponding control signals 151, which represent the temperature of the respective cathode 12. Each temperature sensor 147 of said second plurality of temperature sensors sends the respective control signals 151 to the control unit 16. Said control signals are sent through the connector 146, which joins the second panel 14 to the panel 20 of the respective power block on which said control unit 16 can be mounted.

In one embodiment, the method comprises a step of thermal conditioning. In that step of thermal conditioning, a thermal conditioning system 17 conditions the temperature of the power module 1. In particular, in one embodiment in which the thermal conditioning system 17 includes a fan 17A, the fan 17A rotates at a speed of rotation for distributing a flow of coolant fluid in a transversal direction T. That flow of coolant fluid strikes said plurality of batteries 10, modifying its temperature.

In one embodiment, the control unit generates drive signals, as a function of the control signals, which are received from said temperature sensor 15 (from the first plurality of temperature sensors 137 and/or from the second plurality of temperature sensors 147). In one embodiment, the speed of rotation of the fan 17A is a function of the drive signals. The control unit sends the drive signals to the thermal conditioning system 17 for modifying its operating configuration (for controlling the speed of rotation of the fan 17A).

In one embodiment, the method comprises a fixing step. In that fixing step the plurality of batteries 10, the first panel 13 and the second panel 14 are constrained and kept in an assembly position. That fixing step occurs by means of a plurality of tie rods 18. In that fixing step, the plurality of tie rods 18 is inserted in a first plurality of assembly holes 134, which are made in the first panel 13. In that fixing step, the plurality of tie rods 18 passes through a space between the first panel and the second panel, and the tie rods are positioned in cavities left between the batteries 10 of said plurality. In that fixing step, the plurality of tie rods 18 is inserted in a second plurality of assembly holes 144, which are made in the second panel 14. In that fixing step, the plurality of tie rods 18 is tightened in such a way as to make each terminal 131, 141 of said first and second pluralities come into contact with the respective anode 11 and cathode 12 of the corresponding battery 10.

According to one aspect of this description, this invention also provides a method for assembling an integrated electric power system 100.

In one embodiment, the method includes a grouping step. The grouping step comprises a first grouping step, wherein a plurality of power modules 1 is grouped to form at least one block 101. In said at least one block 101, the modules 1 are connected in series or in parallel.

The grouping step comprises a second grouping step, wherein a plurality of blocks 101 is grouped to form at least one string 102. In said at least one string 102, the blocks 101 are connected in series or in parallel.

The grouping step comprises a third grouping step, wherein a plurality of strings 102 is grouped to form said integrated power system 100. In the power system 100 the strings 102 may be connected in series or in parallel.

In a preferred embodiment, in the first grouping step the modules 1 are connected in parallel. In a preferred embodiment, in the second grouping step the blocks 101 are connected in series. In a preferred embodiment, in the third grouping step the strings 102 are connected in parallel.

In one embodiment, the method comprises a step of preparing a plurality of panels 20. Those panels have the dual function of mechanically connecting the blocks 101 of the system 100 and of electrically connecting the modules 1 of a block 101 and/or the blocks 101 of a string 102.

In particular, the method comprises a mechanical fixing step. In the mechanical fixing step, a panel 20 of said plurality is mechanically fixed by means of a plurality of mechanical connectors to a first block 101A, a second block 101B and a third block 101C. In particular, a panel 20 of said plurality is mechanically fixed to the second panels 14 of the modules 1 of the first block 101A. The panel 20 of said plurality is mechanically fixed to the first panels 13 and to the second panels 14 of the modules 1 of the second block 101B. A panel 20 of said plurality is mechanically fixed to the first panels 13 of the modules 1 of the third block 101C.

In particular, the method comprises an electrical integration step. In the mechanical fixing step, a panel 20 of said plurality is electrically connected by means of a plurality of electrical connectors to a first block 101A, a second block 101B and a third block 101C. In particular, a panel 20 of said plurality is electronically connected to the second panels 14 of the modules 1 of the first block 101A by means of a first plurality of electrical connectors 21. A panel 20 of said plurality is electronically connected to the first panels 13 and to the second panels 14 of the modules 1 of the second block 101B by means of a second plurality of electrical connectors 22. A panel 20 of said plurality is electrically connected to the first panels 13 of the modules 1 of the third block 101C by means of a third plurality of electrical connectors 23.

In one embodiment, the method comprises a shared control step, wherein a management unit 16' acts as a monitoring and control unit for the modules 1 which belong to a block 101.

In one embodiment, the method comprises a step of first supervision, wherein a further management unit controls the plurality of blocks 101 of a string 102. In one embodiment, the method comprises a step of second supervision, wherein a supervising unit controls the plurality of strings 102 of the integrated power system 100.

In particular, the management unit 16' performs one or more of the following steps:

Measuring the voltage of the block 101;

Receiving control signals 151 of all of the modules 1 and monitoring a temperature of the anode 11 and of the cathode 12 of each battery 10 of each module 1;

Sending drive signals, as a function of the control signals 151, to the thermal conditioning system 17 of each module 1;

Electrical charging of the modules for equalising the voltage between the blocks 101;

Sending to the supervising unit the status of each battery, in particular the condition of each electrode of each battery of each module, as a function of the control signals 151.

In one embodiment, the further management unit, which controls a string 102, performs one or more of the following steps:

Equalising the modules 1 which belong to the blocks 101, by activating the equalisation circuits installed on each block 101;

Activating the thermal conditioning system 17' (for example activating said at least one fan 17');

Generating limiting signals for the user of the battery either in charging or in discharging mode;

Sorting of the voltages of the blocks 101;

Sorting of the temperatures of the batteries associated with the blocks 101.

In one embodiment, the supervising unit of the power system 100 performs one or more of the following steps:

Collection of information about the individual batteries and generation of a report containing information about the entire power system 100;

Generation of limiting signals or enabling signals for devices connected to the power system 100;

Calculation of a charge status of the power system 100, which represents a remaining quantity of electric power;

Estimation of the health status of the power system 100.

The invention claimed is:

1. An electric power module, comprising:
a plurality of electric power units, each of which extends along a longitudinal direction from a first end, including a first electrode, to a second end, including a second electrode, the power units of the plurality being juxtaposed with each other transversely to the longitudinal direction;
a first panel, having an inside surface, facing towards the first ends of the power units of the plurality of power units, and including a first plurality of contact elements, each of which is in contact with the first electrode of a corresponding power unit; and
a second panel, having an inside surface, facing towards the second ends of the power units of the plurality of power units, and including a second plurality of contact elements, each of which is in contact with the second electrode of a corresponding power unit;
wherein the first panel comprises a first plurality of holes, each of which is aligned, along the longitudinal direction, with a respective contact element of the first plurality of contact elements and with a respective first electrode and wherein the second panel comprises a second plurality of holes, each of which is aligned, along the longitudinal direction, with a respective contact element of the second plurality of contact elements and with a respective second electrode;
wherein the first panel and the second panel each include a printed circuit board having an inside surface and an outside surface, the inside surface facing a respective electric power unit of the plurality of electric power units, wherein the printed circuit boards of the first panel and second panel are connected to the first plurality of contact elements and to the second plurality of contact elements, respectively, each printed circuit board including a plurality of tracks that transmit, through the first plurality of contact elements or the second plurality of contact elements, the electric power of the plurality of electric power units to an external device, the first plurality of contact elements and the second plurality of contact elements being connected to the inside surfaces of the first circuit board and the second circuit board, respectively; and
wherein each contact element of the first plurality of contact elements and of the second plurality of contact elements includes a tab having
a central portion, in contact with a respective first or second electrode of a respective electric power unit, and
a first and a second lateral end, connected to the inside surface of the first panel or the second panel, and positioned at opposite sides of the hole aligned with the corresponding first or second electrode,
the central portion being interposed between the first and a second lateral end, along a transversal direction orthogonal to the longitudinal direction,
wherein the central portion is longitudinally offset the first and a second lateral end, so that the central portion protrudes towards the first or second electrode of the respective electric power unit.

2. The electric power module according to claim 1, comprising a first connector, configured to be connected to the first plurality of contact elements, and a second connector, configured to be connected to the second plurality of contact elements, the first connector and the second connector being configured to transfer the electric power supplied by the module to a panel which the module can be integrated with.

3. The electric power module according to claim 2, comprising a temperature sensor configured to detect a temperature of the electric power module and connected to a control unit to send it control signals representing the temperature of the electric power module.

4. The electric power module according to claim 3, comprising a plurality of temperature sensors, each associated with a respective electric power unit of the plurality of electric power units and connectable to the control unit, to send it a control signal representing the temperature of the respective electric power unit.

5. The electric power module according to claim 3, comprising a cooler for thermal conditioning, configured to modify the temperature of the electric power module, and wherein the control unit is configured to generate drive signals as a function of the control signals and to send the drive signals to the cooler to regulate the temperature of the power module by feedback.

6. The electric power module according to claim 1, comprising a spacer mounted between the inside surface of the first panel or the second panel and the first ends or the second ends, respectively, of the plurality of electric power units.

7. The electric power module according to claim 6, comprising:

a first spacer disposed between the inside surface of the first panel and the first ends of the plurality of electric power units;

a second spacer disposed between the inside surface of the second panel and the second ends of the plurality of electric power units.

8. The electric power module according to claim 6, wherein the spacer includes a plate which, for each electric power unit, has a recess configured to receive the first end or the second end of the respective electric power unit and a through hole made inside the recess and configured to allow the first electrode or the second electrode of the respective electric power unit to come into contact with the respective contact element of the first plurality of contact elements or second plurality of contact elements of the first panel or second panel, respectively.

9. The electric power module according to claim 1, wherein the module comprises a plurality of tie rods, coupled to the first panel and to the second panel to keep the plurality of electric power units in an assembly position.

10. An integrated electric power system, comprising:
a plurality of electric power modules according to claim 1, which are connected to each other to provide a supply current for a supply voltage;
a supervising unit, connected to each control unit of the plurality of electric power modules to receive the respective control signals.

11. The system according to claim 10, wherein the electric power modules of the plurality of electric power modules are connected to each other in parallel to form a plurality of power blocks, and wherein the blocks of the plurality of power blocks are connected to each other in series to form corresponding power strings.

12. A method for assembling an electric power module, comprising the following steps:
preparing a plurality of electric power units, each of which extends along a longitudinal direction from a first end, including a first electrode, to a second end, including a second electrode;
positioning the plurality of electric power units between a first panel, including a first plurality of contact elements, each of which is in contact with the first electrode of a corresponding electric power unit to define first soldering zones, and a second panel, including a second plurality of contact elements, each of which is in contact with the second electrode of a corresponding power unit to define second soldering zones;
first soldering between the first plurality of contact elements and the first electrodes of the plurality of electric power units at the first soldering zones to make an electrical connection between the first electrodes and the respective contact elements of the first panel; and
second soldering between the second plurality of contact elements and the second electrodes of the plurality of electric power units at the second soldering zones to make an electrical connection between the second electrodes and the respective contact elements of the second panel;

wherein in the step of first soldering, the first soldering zones are accessible through a first plurality of holes, each of which is aligned, along the longitudinal direction, with a respective contact element of the first plurality of contact elements and wherein in the step of second soldering, the second soldering zones are accessible through a second plurality of holes, each of which is aligned, along the longitudinal direction, with a respective contact element of the second plurality of contact elements; and wherein each contact element of the first plurality of contact elements and of the second plurality of contact elements includes a tab having
a central portion, in contact with a respective first or second electrode of a respective electric power unit, and
a first and a second lateral end, connected to the inside surface of the first panel or the second panel, and positioned at opposite sides of the hole aligned with the corresponding first or second electrode,
the central portion being interposed between the first and a second lateral end, along a transversal direction orthogonal to the longitudinal direction,
wherein the central portion is longitudinally offset the first and a second lateral end, so that the central portion protrudes towards the first or second electrode of the respective electric power unit.

13. The method according to claim 12, comprising a step of fixing the first panel to the second panel through a plurality of tie rods to keep the plurality of electric power units in an assembly position.

14. The method according to claim 12, wherein the step of first soldering and the step of second soldering are done by laser soldering.

15. The electric power module according to claim 1, wherein at least one of the first panel and the second panel includes a printed circuit board, the printed circuit board being connected to the first plurality of contact elements or to the second plurality of contact elements, respectively, and including a plurality of tracks configured to transmit, through the first or second plurality of contact elements, the electric power of the plurality of batteries to an external device.

16. The electric power module of claim 15, wherein the plurality of tracks is on an inside surface, on an outside surface, or in internal layers of the printed circuit board located between the outside surface and the inside surface.

17. The electric power module of claim 1, wherein the contact elements are connected to an inside surface of the first panel and second panel.

18. The method of claim 12, wherein at least one of the first panel and the second panel includes a printed circuit board, the printed circuit board being connected to the first plurality of contact elements or to the second plurality of contact elements, respectively, and including a plurality of tracks configured to transmit, through the first or second plurality of contact elements, the electric power of the plurality of batteries to an external device.

* * * * *